United States Patent

Kutschker

[11] Patent Number: 5,950,484
[45] Date of Patent: Sep. 14, 1999

[54] BENDING CENTER

[75] Inventor: Wolfgang Kutschker, Boeblingen, Germany

[73] Assignee: Reinhardt Maschinenbau GmbH, Sindelfingen, Germany

[21] Appl. No.: 09/083,708

[22] Filed: May 22, 1998

Related U.S. Application Data

[63] Continuation of application No. PCT/EP97/04772, Sep. 2, 1997.

[30] Foreign Application Priority Data

Sep. 26, 1996 [DE] Germany ............................ 196 39 590

[51] Int. Cl.$^6$ .................................................... B21J 13/10
[52] U.S. Cl. ............................... 72/420; 72/422; 72/17.3; 72/18.6; 72/19.4; 72/19.6
[58] Field of Search .................................... 72/16.8, 16.9, 72/17.3, 18.5, 18.6, 18.8, 19.4, 19.6, 31.1, 31.11, 31.12, 37, 389.1, 389.3, 389.4, 420, 422, 441, 443, 446; 483/14, 15

[56] References Cited

U.S. PATENT DOCUMENTS

| 4,706,491 | 11/1987 | Sartorio ........................................ 72/37 |
| 5,058,406 | 10/1991 | Sartorio et al. ............................ 72/422 |
| 5,187,958 | 2/1993 | Prunetto et al. ........................... 72/422 |
| 5,642,291 | 6/1997 | Prunetto et al. ........................... 72/422 |
| 5,761,940 | 6/1998 | Moore, Jr. et al. ...................... 72/19.4 |

FOREIGN PATENT DOCUMENTS 2 584 633  1/1987  France .
39 02 149  8/1989  Germany .

OTHER PUBLICATIONS

Takeji, Murakoshi. *Patent Abstracts of Japan*, Abstract of Japanese Patent No. 4–46644, "Loading Device for Positioning Original Position", Feb. 17, 1992, vol. 016, No. 229.

"Massgeschneiderte Blechkonfektion", *Maschine und Werkzeug*. vol. 20, 1994, pp. 60 to 62.

*Primary Examiner*—Joseph J. Hail, III
*Assistant Examiner*—Ed Tolan
*Attorney, Agent, or Firm*—Barry R. Lipsitz; Ralph F. Hoppin

[57] ABSTRACT

In order to improve a bending center comprising a bending unit, a loading device with a feed table for receiving a sheet-metal part to be inserted, and a manipulator arrangement, with which the sheet-metal part can be gripped, moved as well as rotated, in such a manner that handling of the sheet-metal part is as error-free as possible with loading times which are as short as possible it is suggested that the loading device have a sensor, with which the position of the sheet-metal part relative to a defined insertion position into the bending unit can be determined, and that the loading device have a control which controls the manipulator arrangement handling the sheet-metal part with respect to the movement in the first and second directions as well as the rotation about the axis of rotation on the basis of the position of the sheet-metal part determined by the sensor in such a manner that the manipulator arrangement inserts the sheet-metal part into the bending unit in the exactly defined insertion position.

27 Claims, 4 Drawing Sheets

BENDING CENTER

This application is a continuation of International PCT Application No. PCT/EP97/04772 filed on Sep. 2, 1997.

BACKGROUND OF THE INVENTION

The invention relates to a bending center comprising a bending unit and a loading device with a feed table for receiving a sheet-metal part to be inserted, a manipulator arrangement, with which the sheet-metal part can be gripped on the feed table and moved in a first direction as well as a second direction extending transversely to the first direction as well as rotated about an axis of rotation at right angles to a plane defined by the first and second directions.

Bending centers of this type are known from the state of the art. The problem with these is that a sheet-metal part supplied to them has, first of all, to be positioned exactly, for example by stop means, and only after exact positioning of the sheet-metal part can any handling thereof take place by means of the manipulator arrangement in order to then bring the sheet-metal part into an exact insertion position of the bending unit, proceeding from an exact starting position.

Reaching such an exact insertion position is, on the one hand, time-consuming and leads, particularly with an automated supply, on the one hand to a considerable time requirement for the positioning and, on the other hand, to errors in positioning possibly occurring which later result in rejected or damaged parts.

SUMMARY OF THE INVENTION

The object underlying the invention is therefore to improve a bending center of the generic type such that handling of the sheet-metal part is as error-free as possible with loading times which are as short as possible.

This object is accomplished in accordance with the invention, in a bending center of the type described at the outset, in that the loading device has a sensor, with which the position of the sheet-metal part relative to a defined insertion position into the bending unit can be determined and that the loading device has a control which controls the manipulator arrangement handling the sheet-metal part with respect to the movements in the first and the second direction as well as the rotation about the axis of rotation, on the basis of the position of the sheet-metal part determined by the sensor, in such a manner that the manipulator arrangement inserts the sheet-metal part into the bending unit in the exactly defined insertion position.

The advantage of the inventive solution is to be seen in the fact that with it the manipulator arrangement not—as in the state of the art—serves exclusively to insert the sheet-metal part into the bending unit but is used at the same time to position the sheet-metal part exactly, proceeding from a rough positioning, in the area of the feed table, wherein a determination of the position of the sheet-metal part with the sensor precedes this exact positioning.

This means that a considerable reduction in the loading time can be achieved since the time-consuming exact positioning of the sheet-metal part prior to handling thereof by the manipulator arrangement does not apply.

In addition, an erroneous handling of the sheet-metal part by the manipulator arrangement is avoided in the case of an initial positioning error since the manipulator arrangement does not proceed from an exact starting position of the sheet-metal part but determines the position of the sheet-metal part in any case by way of the sensor, and the position of the sheet-metal part can then be corrected as a result of handling in the manipulator arrangement such that the exact insertion position can be reached.

In principle, it is possible to arrange the one or several sensors such that the sheet-metal part is measured by them when the manipulator arrangement moves the sheet-metal part past them. For reasons of the calculation time it is, however, advantageous when the control ascertains the position of the sheet-metal part prior to the handling thereof by the manipulator arrangement. This has the advantage that no delay whatsoever in the handling is necessary due to the calculation of the transfer coordinates but these are already available prior to commencement of the handling.

In order to be able to determine the position of the sheet-metal part with as few sensors as possible, it is preferably provided for the sensor to be movable in the first and the second direction in order to create the possibility of ascertaining not only the position of the sheet-metal part in the first but also in the second direction and the rotation of the sheet-metal part relative to them.

For this purpose, it would, in principle, be possible to provide a separate device moving the sensor. It is, however, particularly advantageous when the sensor is arranged on the manipulator arrangement and is movable by this in at least one direction. Thus, the provision of a position-controlled axis movement in this direction can be omitted for the sensor and the axis movement of the manipulator arrangement in this direction, which is present in any case, can be utilized.

Since the sheet-metal part must generally be inserted into the bending unit in several positions, it is preferably provided for the manipulator arrangement to have a first manipulator gripping the sheet-metal part on the feed table and moving it in the first direction and a second manipulator taking over the sheet-metal part following the movement in the first direction and moving it in the second direction as well as rotating it about the axis of rotation. As a result of this division of the handling functions for the sheet-metal part between the first manipulator and the second manipulator it is possible to have both working at the same time and, for example, to already move the first manipulator in the direction of the sheet-metal part while the second manipulator is still inserting the sheet-metal part previously supplied to it into the bending unit in different insertion positions.

In principle, any optional gripping of the sheet-metal part by the first manipulator would be conceivable. It has, however, proven to be particularly advantageous when the first manipulator grips the sheet-metal part on a longitudinal side extending approximately in the first direction since it is then particularly easy to transfer it to the second manipulator which is intended to grip the sheet-metal part—in order to be able to rotate it appropriately about the axis of rotation—in a central region.

With respect to the arrangement of the sensor, no further details have been given in conjunction with the preceding explanations concerning the individual embodiments. For example, one expedient embodiment provides for the sensor to detect several locations of an edge region of the sheet-metal part facing it and thus no longer be forced to detect several edge regions but be able to carry out a complete determination of the position of the sheet-metal part via these several locations of the one edge region.

It is particularly expedient when the sensor is arranged on the first manipulator and is movable by this in the first direction. This solution is expedient insofar as more time is generally available during the movement of the first manipulator to take into consideration, in addition, the movements required for the sensor than in the case of the second manipulator since the second manipulator has the task of feeding the sheet-metal part to the bending unit in different positions whereas the first manipulator only has the task of moving the sheet-metal part once from the feed table into the range of action of the second manipulator.

With this solution the movability of the sensor in the first direction is indeed accomplished but not the movement of the sensor in the second direction. For this reason, it is preferably provided for the sensor to be held on the first manipulator so as to be movable in the direction of the second direction. This additional movability allows the sensor to be moved in two directions at right angles to one another and thus to detect the position of the sheet-metal part completely.

For this purpose, it is preferably provided for the position of the sensor in the second direction to be controllable so that the positions in the first direction, at which the sensor carries out a movement transversely to the first direction, namely in the direction of the second direction, can be determined by the control. The control is thus in a position to approach specific locations of a sheet-metal part, the shape of which is entered in the control, and to measure these locations by means of the sensor in order to determine from them the position of the sheet-metal part.

With respect to the arrangement of the sensor on the first manipulator, no further details have so far been given. It is particularly expedient when the sensor is arranged on a side of the manipulator facing the feed table since the possibility then exists, during the movement of the first manipulator in the direction of the feed table in order to grip a sheet-metal part on it, of the sensor already being movable over the sheet-metal part before the manipulator is in a position, in which it can grip the sheet-metal part. This means that, in this case, the sensor is arranged so as to precede the manipulator and the movement of the manipulator in the direction of the feed table, which is necessary in any case, can already be utilized to obtain the required movement of the sensor in the first direction and so, at the same time, the measurement carried out with the first sensor also does not interfere with the periods of time available for the movement of the first manipulator.

With respect to the design of the sensor, no further details have been given in conjunction with the preceding description of the individual embodiments. It would be possible, for example, to recognize marks on the sheet-metal part by means of the sensor and to detect the position of the sheet-metal part in accordance with this recognized marks. It is, however, particularly advantageous when the sensor is a sensor detecting edges of the sheet-metal part since, in this case, the separate attachment of marks is superfluous as the edges already present on the sheet-metal part can be used for determining its position.

A particularly expedient solution provides for the sensor to be positionable with the control based on data concerning a shape of the sheet-metal part such that it detects edges of cutouts of the sheet-metal part. This solution has the great advantage that the cutouts which are provided in the sheet-metal part with high precision represent exact points of reference for the insertion position of the sheet-metal part into the bending unit.

Within the scope of the preceding explanations concerning the individual embodiments, no details have been given with respect to the design of the sensor itself. One advantageous embodiment, for example, provides for the sensor to comprise a light barrier arranged in a forked member and for the sheet-metal part to engage in the forked member during the determination of the edges. This makes a particularly simple and precise detection of the edges possible since the forked member offers the possibility of positioning the transmitting element and the receiving element of the light barrier at as small a distance as possible above and below the sheet-metal part.

In addition, the object specified at the outset is accomplished in accordance with the invention, in a process for introducing a sheet-metal part to a bending unit of a bending center, in which the sheet-metal part is gripped on a feed table by a manipulator arrangement and moved in a first direction and a second direction extending transversely to the first as well as inserted into the bending unit in various rotary positions around an axis of rotation extending at right angles to the plane defined by the first and the second directions, in that the position coordinates of the sheet-metal part relative to a defined insertion position into the bending unit are measured by means of a sensor and that the manipulator arrangement handling the sheet-metal part performs the movement in the first and the second direction as well as the rotation about the axis of rotation on the basis of the measured position coordinates in such a manner that the sheet-metal part is supplied to the bending unit in the defined insertion position.

The advantage of the inventive process is likewise to be seen in the fact that the handling of the sheet-metal part for insertion thereof into the bending unit, which is necessary in any case, is used at the same time for positioning the sheet-metal part exactly, proceeding from a rough positioning, so that the exact positioning previously in accordance with the state of the art can be omitted and a considerable reduction in the loading times with secure handling of the sheet-metal part at the same time is the result.

With respect to the location of the measurement of the position coordinates of the sheet-metal part, no further details have so far been given. In principle, it is sufficient when the measurement of the position coordinates of the sheet-metal part in the first direction is terminated prior to termination of the movement of the sheet-metal part in the first direction so that during this movement the position of the sheet-metal part. can be taken into account and corrected.

Furthermore, it is sufficient when the measurement of the sheet-metal part in the second direction and also with respect to a rotation relative to the second direction is terminated prior to termination of the movement in the second direction since the correction of the position coordinates in the second direction can take place with the movement in this direction and, at the same time, the correction of any rotation with respect to the second direction can be carried out.

A particularly favorable solution does, however, provide for the determination of the position coordinates to take place in the region of the feed table.

In this respect, it is particularly expedient when the position of the sheet-metal part is measured prior to handling by the manipulator since calculation time is thus available in order to ascertain the control parameters for the manipulator and the movements by the manipulator are not impaired by the measurement of the position of the sheet-metal part and the required calculation time.

The measurement of the position coordinates may be carried out particularly favorably when the sensor is moved relative to the sheet-metal part during the measurement of the position coordinates so that the measurement of the position coordinates of the sheet-metal part can take place in a simple manner with the sheet-metal part not moving.

Movement of the sensor can take place in the most varied of ways, for example, by means of drives provided for the sensor. A particularly advantageous solution provides for the sensor to be moved by the manipulator arrangement in at least one direction during the measurement of the position coordinates so that the numerically controlled movement of the manipulator arrangement can also be used at the same time for moving the sensor.

A variation of the inventive solution is particularly advantageous when the position of the sensor in the first direction is determined via the position of the manipulator arrangement so that the position determination necessary in any case for the movement of the manipulator arrangement can also be utilized at the same time for determining the position of the sensor.

Furthermore, in such an advantageous embodiment, in which the sensor is moved in one direction by the manipulator arrangement, it is provided, that the sensor is moved in the second direction in an automatic and controlled manner in order not to affect the remaining actions of the manipulator arrangement during this additional movement.

It is of advantage, in particular, with respect to achieving loading times which are as short as possible when the sheet-metal part is moved away from the feed table in the first direction by a first manipulator and is moved in the second direction by a second manipulator and rotated about the axis of rotation. This division of the handling of the sheet-metal part is favorable because the insertion of the sheet-metal part into the bending unit generally requires several steps and is thus time-consuming and so this time can be used for a sheet-metal part to be gripped by the first manipulator.

At the same time, the first manipulator can also be used to move the sensor in the first direction, wherein the sensor, for its part, is preferably movable relative to the first manipulator, in addition, in a controlled manner in the direction of the second direction.

With respect to the measurement of the position coordinates, no further details have so far been given. For example, an advantageous solution provides for the measurement of the position coordinates to take place by way of measurement of edge positions of the sheet-metal part, wherein cutouts of the sheet-metal part are preferably detected since these cutouts are introduced into the sheet-metal part in a defined position and thus make an exact detection of the position coordinates of the sheet-metal part possible, particularly with respect to the bending of the sheet-metal part in the bending center.

Additional features and advantages of the invention are the subject matter of the following description as well as the drawings illustrating one embodiment.

DETAILED DESCRIPTION OF THE INVENTION

Figure 1:
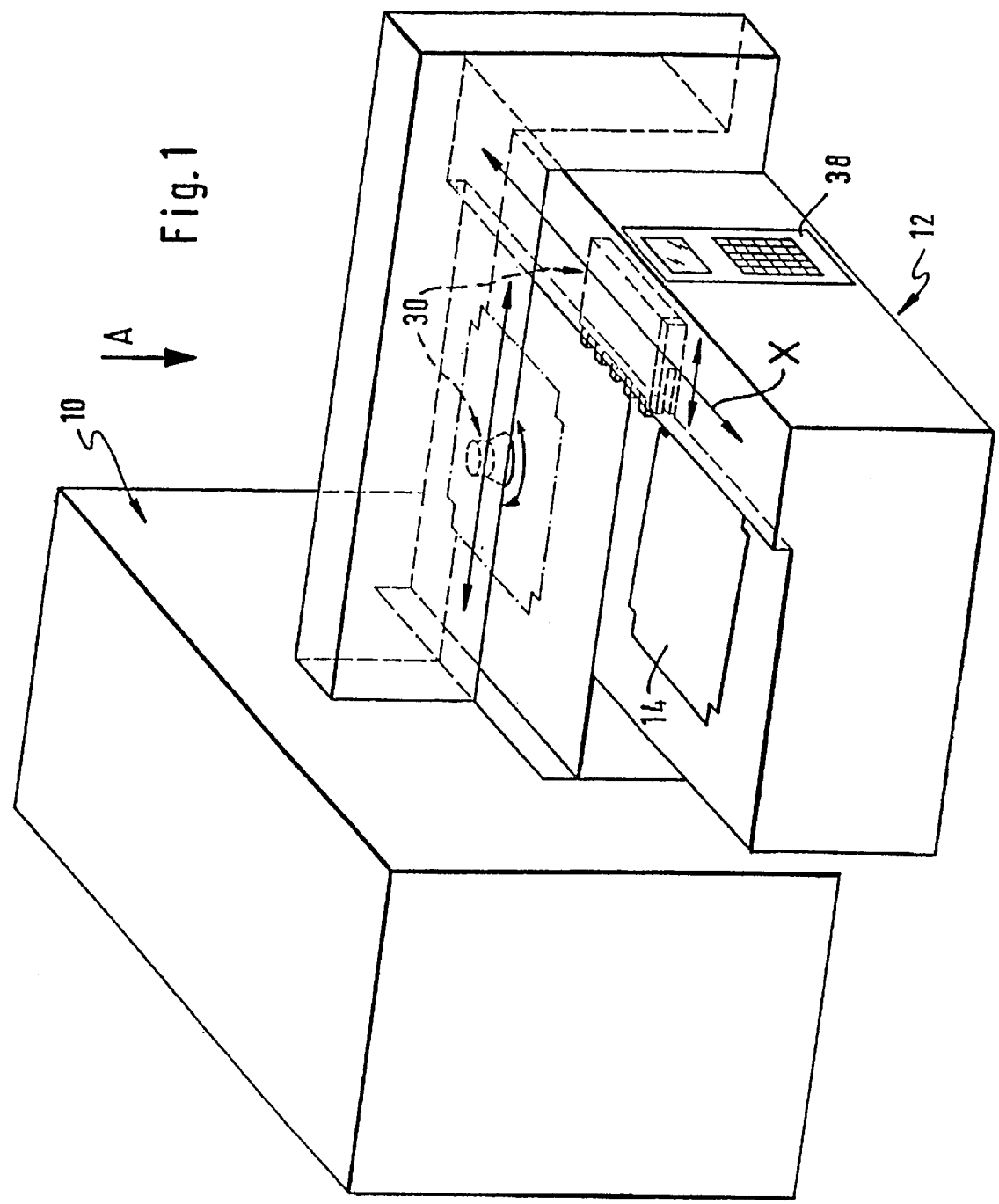
FIG. 1 shows a perspective view of an inventive bending center.
Figure 2:
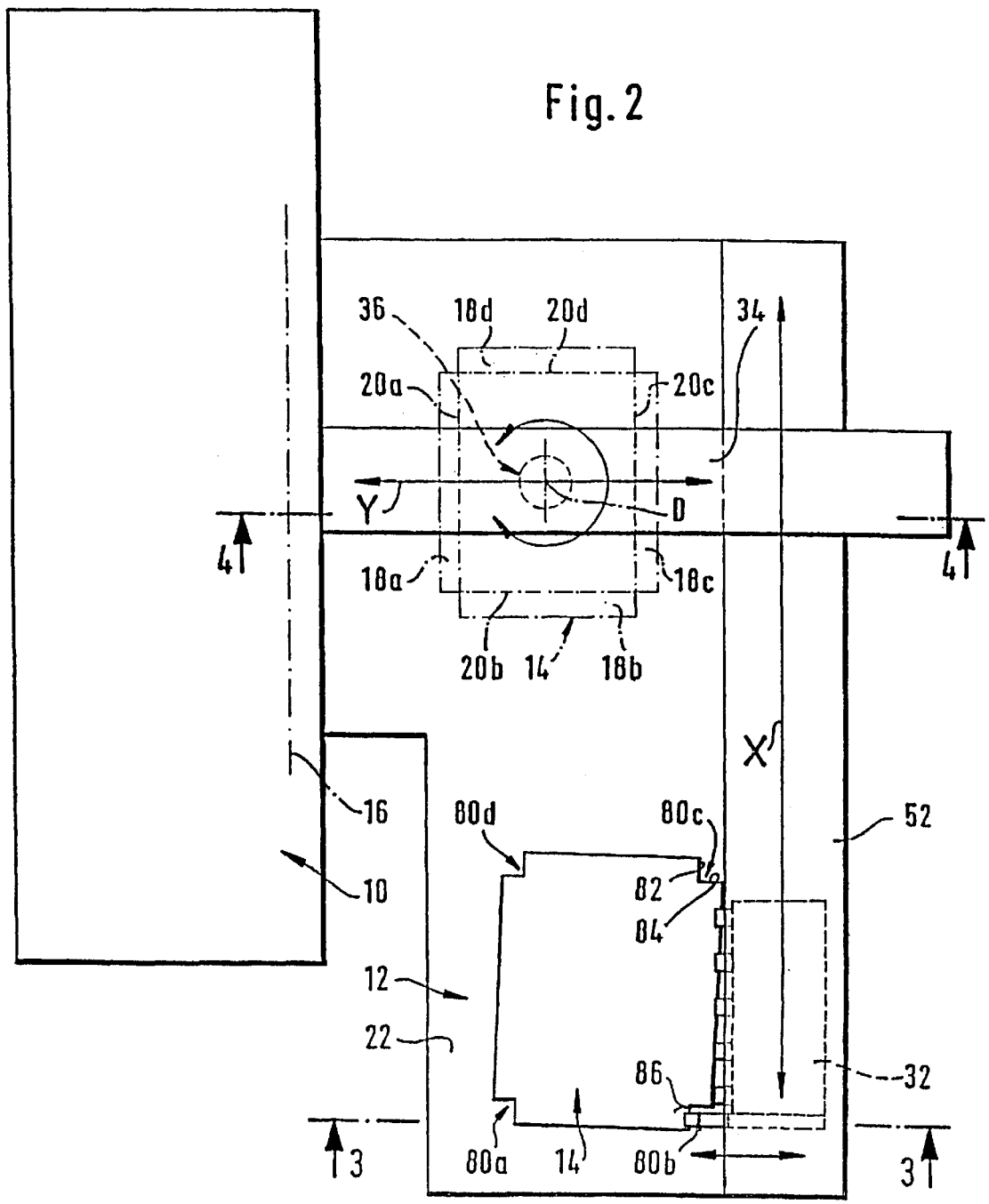
FIG. 2 shows a plan view of the bending center in accordance with arrow A in FIG. 1.

An embodiment of an inventive bending center illustrated in FIG. 1 comprises a bending unit designated as a whole as 10 and a loading device which is designated as a whole as 12 and with which a sheet-metal part 14, as is apparent in FIG. 2, can be supplied to the bending unit 10, in particular, a bending device symbolized by the dash-dot bending line 16 in an insertion position defined in such a manner that, for example, a folding of the edge regions 18a to d of the sheet-metal part 14 takes place along required bending lines 20a to d specified by a shape of the sheet-metal part 14. Thus, the insertion position for the sheet-metal part 14 is, for example, defined in such a manner that all the bending lines 20a to d of the sheet-metal part 14 can be positioned exactly congruent with the bending line 16 of the bending unit 10.

The inventive loading device 12 comprises for this purpose a feed table 22, onto which the sheet-metal part 14 can be placed manually or by an additional supply device, wherein a rough positioning of the sheet-metal part 14 in a gripping area of a manipulator arrangement designated as a whole as 30 is adequate.

The manipulator arrangement 30 comprises a first manipulator 32 which, as illustrated in FIGS. 1 and 2, serves to transport the sheet-metal part 14 in an X direction away from the feed table 22 into a range of action 34 of a second manipulator 36. The second manipulator 36 transports the sheet-metal part 14, after gripping it, in a Y direction which preferably extends at right angles to the X direction, and rotates the sheet-metal part 14, in addition, about an axis of rotation D which is at right angles to a plane defined by the X direction and the Y direction, wherein the sheet-metal part 14 extends in the plane defined by the X direction and the Y direction.

Both manipulators are thereby controlled by a control which is designated as a whole as 38 and in which the shape of the sheet-metal part 14 and the bending lines 20a to 20d as well as the coordinates of the bending line 16 of the bending unit 10 are stored.

Figure 3:
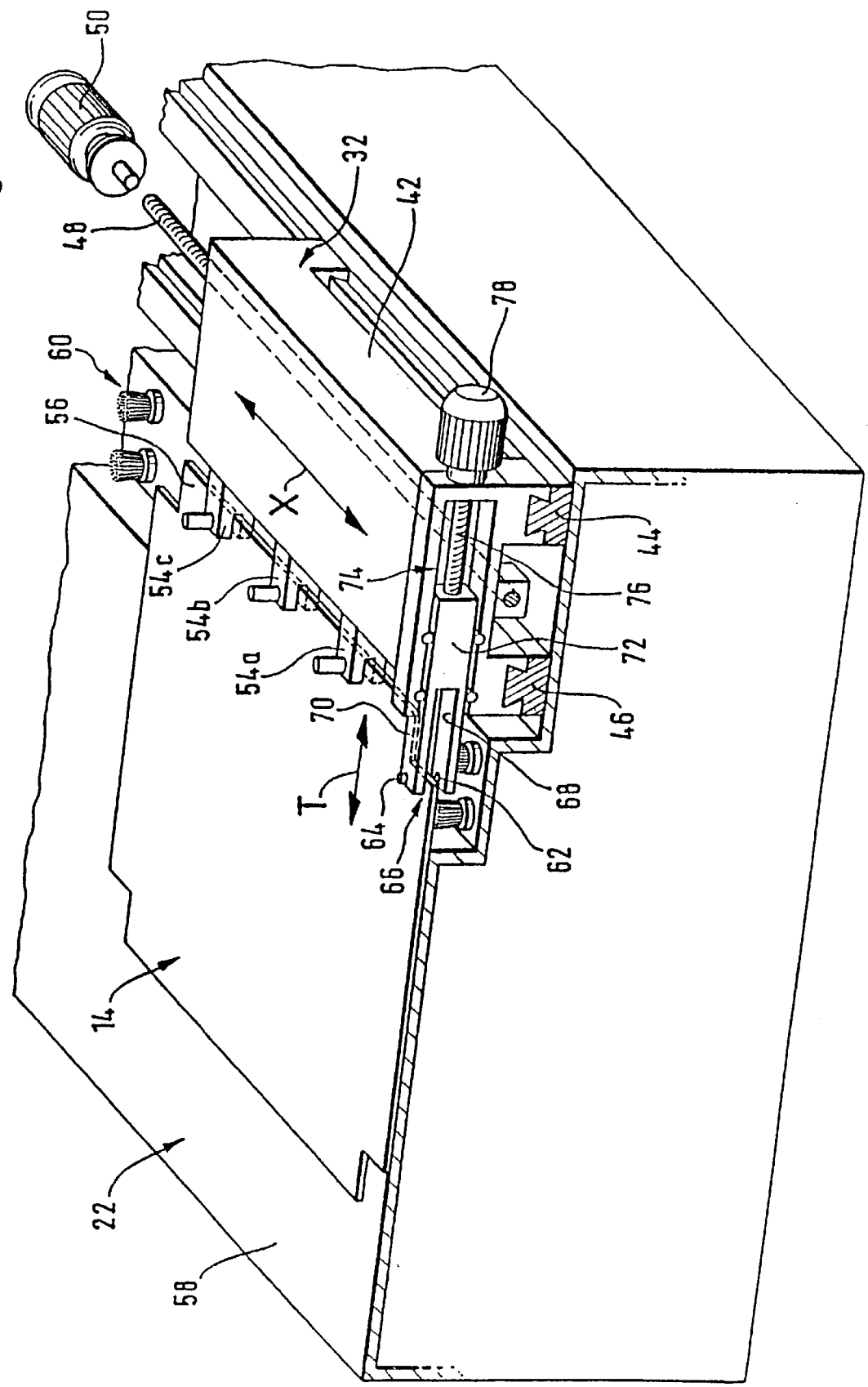
FIG. 3 shows a section along line 3—3 in FIG. 2.

The first manipulator 32 comprises, as illustrated in FIG. 3, a manipulator carriage 42 which is guided on two linear guide means 44 and 46 extending in X direction and parallel to one another and can be positioned along the X direction, for example, by means of a threaded spindle 48, driven by a spindle drive 50, in a numerically controlled manner via the control 38.

The linear guide means 44 and 46 with the manipulator carriage 42 are thereby arranged at a longitudinal side 52 of the loading device 12 and can thus be displaced along the feed table 22.

On its side facing the feed table 22 the manipulator carriage 42 has several gripping tongs 54a to c, with which the sheet-metal part 14 can be gripped in an edge region 56 facing the manipulator carriage 42 and extending approximately along the X direction.

The sheet-metal part 14 is thereby located essentially on a surface 58 of the feed table 22 which does not, however, extend as far as the edge region 56. Rather, the edge region 56 is supported by a field of brushes 60 which allows unhindered access of the gripper tongs 54a to c.

A sensor 66 which comprises a transmitting element 62 and a receiving element 64 and operates, for example, according to the principle of a light barrier, is held, in addition, at an end of the manipulator carriage 42 of the first manipulator 32 facing away from the range of action 34 of the second manipulator and facing the feed table 22. In this respect, the transmitting element 62 is held on a first finger 68 and the receiving element 64 on a second finger 70 of a forked sensor member which is designated as whole as 72 and is, for its part, held on a linear guide means 74 arranged on the manipulator carrier 42 and can be moved by the linear guide means 74 in a direction T which extends parallel to the Y direction. The positioning of the forked sensor member 72 is brought about via a threaded spindle 76 as well as a spindle drive 78 which is associated with it and likewise makes a numerically controlled positioning of the sensor 66 in the T direction possible, controlled by the control 38.

The forked sensor member 72 is thereby located such that during movement thereof in T direction towards the sheet-metal part 14 the second finger 70 thereof extends over an upper side of the sheet-metal part 14 and the first finger 68 thereof extends under a lower side of the sheet-metal part 14 in order to detect edge positions in the edge region 56 by means of the sensor 66.

As illustrated in FIG. 2, the edge positions are preferably detected in the region of notches 80b and 80c previously cut into the sheet-metal part 14, wherein an edge 82 extending transversely to the Y direction and an edge 84 extending transversely to the X direction are detected in the notch 80c facing the first manipulator 32 and the second manipulator 36 and only the edge 86 extending transversely to the Y direction is detected in the region of the notch 80b facing the first manipulator 32. An exact detection of the position of the sheet-metal part 14 relative to the later insertion position into the bending unit 10 is possible as a result of the detection of the notches 80b and c since the notches 80a to d are cut into the sheet-metal part 14 in a defined arrangement relative to one another and, on the other hand, the notches 80a to d also define the bending lines 20a to d desired on the sheet-metal part 14 exactly.

The position of the sheet-metal part 14 on the feed table 22 can be determined exactly via the position of the edges 82, 84 and 86 relative to the insertion position and, in particular, to the bending line 16 of the bending unit 10 and, in particular, the distance in X direction, through which the sheet-metal part 14 must be moved with the first manipulator 32 in the direction of the second manipulator 36 in order to ensure that this grips the sheet-metal part 14 in a position which exactly specifies the relative position of the bending lines 20b and 20d relative to the axis of rotation D, can be determined exactly for the control 38. The rough positioning of the sheet-metal part 14 on the feed table 22 in the X direction is thus corrected into an exact positioning in relation to the X direction as a result of the transport of the sheet-metal part 14 by means of the first manipulator 32 in the direction.

Figure 4:
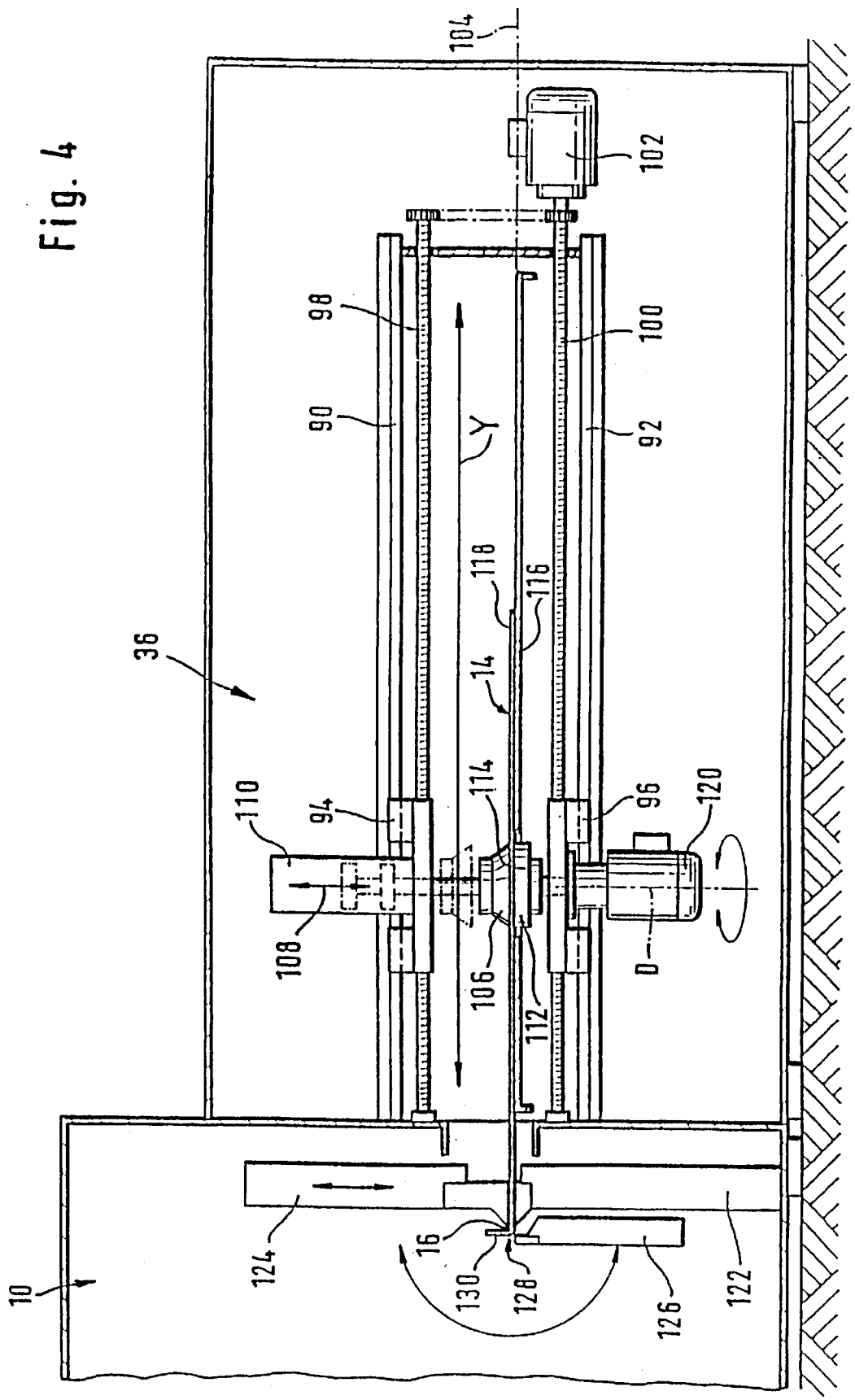
FIG. 4 shows a section along line 4—4 in FIG. 2.

As illustrated in FIG. 4, the second manipulator 36 comprises two linear guide means extending parallel to one another in Y direction, namely an upper linear guide means 90 and a lower linear guide means 92, wherein an upper guide carriage 94 on the upper linear guide means 90 and a lower guide carriage 94 on the lower linear guide means 92 are guided synchronously to one another and located opposite one another. For this purpose, each of the guide carriages can be positioned in Y direction via a threaded spindle 98 and 100, respectively. The two threaded spindles 98 and 100 can be driven via a common spindle drive 102 so that the movement of the guide carriages 94 and 96 in the Y direction likewise takes place in the form of a numerically controlled axis.

The two guide carriages 94 and 96 are arranged on opposite sides of a plane of movement 104 of the sheet-metal part 14 to be handled, wherein for gripping the sheet-metal part 14 a bell-shaped gripper member 106 is arranged on the upper guide carriage 94 and this is movable in a direction 108 at right angles to the plane of movement 104 by means of a cocking cylinder 110. A plate-like gripper member 112 is provided on the lower guide carriage 96 and this extends with a plate-like surface approximately in the plane 104 and is thus in a position to support the sheet-metal part 14 on an underside 116. At the same time, the sheet-metal part can be clamped between the plate-like gripper member 112 and the bell-shaped gripper member 106 by the bell-shaped gripper member 106 being pressed onto an upper side 118 of the sheet-metal part 14 by the cocking cylinder 110.

Narrow rectangular strips can, for example, also be used instead of the bell-shaped gripper member 106 and the plate-like gripper member 112.

Both the plate-like gripper member 112 and the bell-shaped gripper-member 106 are mounted on the respective guide carriages 96 and 94 for rotation about the common axis of rotation D, wherein the plate-like gripper member 112 is rotatable by means of a rotary drive 120. The rotary drive 120 can be numerically controlled by the control 38, and the axis of rotation D thus represents a numerically controlled axis of rotation.

As illustrated, in addition, in FIG. 4, the bending unit 10 comprises a customary bending device with a lower beam 122, an upper beam 124 movable relative to this as well as a bending beam 126 which is pivotable about a pivot axis 128 in order to fold, for example, an edge region 130 on the sheet-metal part 14 which is located outside the bending lines 20a to d. In this respect, the bending line 16 of the bending unit 10 is determined by clamping tools of the lower beam 122 and the upper beam 124.

The sheet-metal part 14 exactly positioned by the first manipulator 32 in X direction in the range of action 34 of the second manipulator 36—as already described—is now gripped by the second manipulator 36, i.e. by means of the plate-like gripper member 112 and the bell-shaped gripper member 106, and firmly clamped between them. As a result of the numerically controlled movement of the two in Y direction, an exact positioning of the sheet-metal part in Y direction relative to the bending line 16 may be carried out at the same time and a possible twisting of the bending lines 20 provided for the sheet-metal part 14 relative to the bending line 16 of the bending unit 10 corrected at the same time so that the sheet-metal part 14 with the specified bending lines 20 can be positioned exactly at the bending line 16 of the bending unit 10.

As already described, the position coordinates of the sheet-metal part 14 are ascertained on the feed table 22 in a rest position of the sheet-metal part, wherein the position of the edge 84 extending transversely to the X direction already allows the distance, by which the sheet-metal part 14 is to be moved from the first manipulator 32 to the second manipulator 36, to be ascertained exactly. At the same time, the distances, by which the sheet-metal part 14 is to be moved later by means of the second manipulator 36 in the direction of the bending unit, are ascertained, on the one hand, by way of the position of the two edges 82 and 86 extending transversely to the Y direction and the extent, to which any twisting of the sheet-metal part 14 in relation to the X direction or the Y direction is present, is ascertained at the same time, wherein this twisting can be corrected by way of rotation about the axis of rotation D when the sheet-metal part 14 is gripped by the second manipulator 36. Thus, as illustrated in FIG. 4, the bending line 20a is first of all to be brought into exact coincidence with the bending line 16, for example, during the movement of the sheet-metal part 14 from the feed table 22 to the bending unit 10 by means of the manipulators 32 and 36 in order to fold the edge 130. The following movements of the second manipulator 36 consist merely of bringing the remaining bending lines 20b to 20d likewise into coincidence with the bending line 16 of the bending unit for carrying out the bending operation by rotating the sheet-metal part 14 in accordance with the shape thereof entered in the control 38.

What is claimed is:

1. A bending center comprising:
   a bending unit,
   a loading device with a feed table for receiving, in a position, a sheet-metal part to be inserted into said bending unit,
   a manipulator arrangement for gripping the sheet-metal part on the feed table and moving it in a first direction, a second direction extending transversely to the first direction, and rotating it about an axis of rotation at right angles to a plane defined by the first and the second directions, wherein:
   the loading device has a sensor for determining the position of the sheet-metal part relative to a defined insertion position into the bendinq unit,
   said sensor detects a plurality of defined edge portions, cut in exact relationship with respect to each other, of the sheet-metal part,
   said sensor and said sheet-metal part are positionable with respect to each other by a controller,
   said controller uses data indicating said defined edge portions for positioning said sensor and said sheet-metal part relative to each other such that said sensor detects the defined edge portions as points of reference for determining said position, and
   the loading device has a control controlling the manipulator arrangement handling the sheet-metal part with respect to movement in the first direction and the second direction as well as the rotation about the axis of rotation on the basis of the position of the sheet-metal part determined by the sensor such that the manipulator arrangement inserts the sheet-metal part into the bending unit in the defined insertion position.

2. A bending center as defined in claim 1, wherein the control ascertains the position of the sheet-metal part prior to the handling thereof by the manipulator arrangement.

3. A bending center as defined in claim 1, wherein the sensor is movable in the first and the second direction.

4. A bending center as defined in claim 3, wherein the sensor is arranged on the manipulator arrangement and is movable by the manipulator arrangement in at least one direction.

5. A bending center as defined in claim 1, wherein the manipulator arrangement has a first manipulator adapted to grip the sheet-metal part on the feed table and move it in the first direction and a second manipulator adapted to take over the sheet-metal part following the movement in the first direction and move it in the second direction as well as rotate it about the axis of rotation.

6. A bending center as defined in claim 5, wherein the first manipulator is adapted to grip the sheet-metal part on a longitudinal side extending approximately in the first direction.

7. A bending center as defined in claim 1, wherein the sensor detects several locations of an edge region of the sheet-metal part facing it.

8. A bending center as defined in claim 5, wherein the sensor is arranged on the first manipulator and is movable by the first manipulator in the first direction.

9. A bending center as defined in claim 8, wherein the sensor is held on the first manipulator so as to be movable in the second direction.

10. A bending center as defined in claim 9, wherein the position of the sensor in the second direction is controllable by the control.

11. A bending center as defined in claim 5, wherein the sensor is arranged on a side of the first manipulator facing the feed table.

12. A bending center as defined in claim 1, wherein the sensor is adapted to detect edges of the sheet-metal part.

13. A bending center as defined in claim 12, wherein the sensor is adapted to be positioned by the control based on data concerning a shape of the sheet-metal part, thereby enabling the sensor to detect edges of cutouts of the sheet-metal part.

14. A bending center as defined in claim 12, wherein:
   the sensor comprises a light barrier arranged in a forked member, and
   the sheet-metal part engages in the forked member during the detection of the defined edge portions.

15. A process for introducing a sheet-metal part to a bending unit of a bending center, comprising the steps of:
   gripping the sheet-metal part on a feed table using a manipulator arrangement,
   moving the sheet-metal part in a first direction and a second direction extending transversely to the first directions,
   inserting the sheet-metal part into the bending unit in at least one of various rotary positions around an axis of rotation extending at right angles to a plane defined by the first and the second directions, wherein
   position coordinates of the sheet-metal part relative to a defined insertion position into the bending unit are measured by means of a sensor,
   said sensor detects a plurality of defined edge portions, cut in exact relationship with respect to each other, of the sheet-metal part.
   said sensor and said sheet-metal part are moveable with respect to each other by a controller,
   said controller uses data indicating the defined edge portions of said sheet-metal part for positioning said sensor and said sheet-metal part relative to each other such that said sensor detects said defined edge portions as points of reference for measuring said position coordinates, and
   the manipulator arrangement handling the sheet-metal part corrects the movement in the first and the second directions as well as the rotation about the axis of rotation on the basis of the measured position coordinates, such that the sheet-metal part is supplied to the bending unit in the defined insertion position.

16. A process as defined in claim 15, wherein the position coordinates of the sheet-metal part are determined in. the region of the feed table.

17. A process as defined in claim 15, wherein the position coordinates of the sheet-metal part are measured prior to the handling thereof by the manipulator arrangement.

18. A process as defined in claim 15, wherein the sensor is moved relative to the sheet-metal part during the determination of the position coordinates thereof.

19. A process as defined in claim 15, wherein the sheet-metal part is moved away from the feed table in the first direction by a first manipulator and is moved in the second direction and rotated about the axis of rotation by a second manipulator.

20. A process as defined in claim 15, wherein the measurement of the position coordinates takes place by way of measurement of edge positions of the sheet-metal part.

21. A process as defined in claim 20, wherein cutouts of the sheet-metal part are detected.

22. A bending center comprising:

a bending unit, a loading device with a feed table for receiving a sheet-metal part to be inserted into said bending unit, a manipulator arrangement for gripping the sheet-metal part on the feed table and moving it in a first direction, a second direction extending transversely to the first direction, and rotating it about an axis of rotation at right angles to a plane defined by the first and the second directions, wherein:

the loading device has a sensor for determining the position of the sheet-metal part relative to a defined insertion position into the bending unit, the loading device has a control controlling the manipulator arrangement handling the sheet-metal part with respect to movement in the first direction and the second direction as well as the rotation about the axis of rotation on the basis of the position of the sheet-metal part determined by the sensor such that the manipulator arrangement inserts the sheet-metal part into the bending unit in the defined insertion position, and wherein the sensor is arranged on the manipulator arrangement and is movable by the manipulator arrangement in at least one direction.

23. A bending center comprising:

a bending unit, a loading device with a feed table for receiving a sheet-metal part to be inserted into said bending unit, a manipulator arrangement for gripping the sheet-metal part on the feed table and moving it in a first direction, a second direction extending transversely to the first direction, and rotating it about an axis of rotation at right angles to a plane defined by the first and the second directions, wherein:

the loading device has a sensor for determining the position of the sheet-metal part relative to a defined insertion position into the bending unit, the loading device has a control controlling the manipulator arrangement handling the sheet-metal part with respect to movement in the first direction and the second direction as well as the rotation about the axis of rotation on the basis of the position of the sheet-metal part determined by the sensor such that the manipulator arrangement inserts the sheet-metal part into the bending unit in the defined insertion position, and the sensor is arranged on the first manipulator and is movable by the first manipulator in the first direction.

24. A process for introducing a sheet-metal part to a bending unit of a bending center, comprising the steps of:

gripping the sheet-metal part on a feed table using a manipulator arrangement, moving the sheet-metal part in a first direction and a second direction extending transversely to the first direction, inserting the sheet-metal part into the bending unit in at least one of various rotary positions around an axis of rotation extending at right angles to a plane defined by the first and the second directions, wherein the position coordinates of the sheet-metal part relative to a defined insertion position into the bending unit are measured by means of a sensor, the manipulator arrangement handling the sheet-metal part corrects the movement in the first and the second directions as well as the rotation about the axis of rotation on the basis of the measured position coordinates, such that the sheet-metal part is supplied to the bending unit in the defined insertion position, and the sensor is moved relative to the sheet-metal part during the determination of the position coordinates thereof.

25. A process as defined in claim 24, wherein the sensor is moved by the manipulator arrangement in at least one direction during the measurement of the position coordinates.

26. A process as defined in claim 25, wherein the position of the sensor in the first direction is determined via the position of the manipulator arrangement.

loading device has a control controlling the manipulator arrangement handling the sheet-metal part with respect to movement in the first direction and the second direction as well as the rotation about the axis of rotation on the basis of the position of the sheet-metal part determined by the sensor such that the manipulator arrangement inserts the sheet-metal part into the bending unit in the [exactly] defined insertion position.

27. A process as defined in claim 24, wherein:

the sensor is moved in one of the first and second directions by the manipulator arrangement, and the sensor is moved in the second direction in an automatic and controlled manner.

* * * * *

UNITED STATES PATENT AND TRADEMARK OFFICE
CERTIFICATE OF CORRECTION

PATENT NO. : 5,950,484
DATED : September 14, 1999
INVENTOR(S) : Kutschker

It is certified that error appears in the above-identified patent and that said Letters Patent is hereby corrected as shown below:

Column 4, line 44: The period after "part" is deleted.
Column 7, line 46: "--X--" is inserted before "direction".
Column 10, line 28: "directions" is changed to --direction--.
Column 10, line 55: The period after "in" is deleted.
Column 12: The extraneous paragraph "loading device . insertion position" between claims 26 and 27 is deleted.

Signed and Sealed this

Eighteenth Day of January, 2000

Attest:

Attesting Officer

Q. TODD DICKINSON

Commissioner of Patents and Trademarks